United States Patent [19]
Brun

[11] Patent Number: 5,451,126
[45] Date of Patent: Sep. 19, 1995

[54] DEEP BORING DRILL

[76] Inventor: Martin Brun, Dangelweg 8, CH-6215 Beromünster, Switzerland

[21] Appl. No.: 211,805
[22] PCT Filed: Aug. 3, 1993
[86] PCT No.: PCT/CH93/00194
  § 371 Date: Apr. 15, 1994
  § 102(e) Date: Apr. 15, 1994
[87] PCT Pub. No.: WO/9404303
  PCT Pub. Date: Mar. 3, 1994

[30] Foreign Application Priority Data

Aug. 17, 1992 [CH] Switzerland ............... 2561/92
Dec. 1, 1992 [CH] Switzerland ............... 3677/92

[51] Int. Cl.⁶ ............... B23B 35/00; B23B 51/04
[52] U.S. Cl. ............... 408/1 R; 408/56; 408/67; 408/204; 408/705
[58] Field of Search ............... 408/1 R, 56, 67, 204, 408/206, 207, 224, 227, 705; 144/92, 365

[56] References Cited

U.S. PATENT DOCUMENTS

| 106,077 | 8/1870 | Purcell | 408/67 |
|---|---|---|---|
| 1,352,825 | 9/1920 | Meredith et al. | 408/207 |
| 1,940,220 | 12/1933 | McGrath | 408/224 |
| 3,584,534 | 6/1971 | Hougen . | |
| 4,204,783 | 5/1980 | Hougen | 408/204 |
| 4,306,570 | 12/1981 | Matthews | 408/206 |
| 4,339,857 | 7/1982 | Dickinson . | |
| 4,630,660 | 12/1986 | McGuire | 408/204 |
| 5,092,716 | 3/1992 | Omi | 408/204 |

FOREIGN PATENT DOCUMENTS

| 375970 | 5/1923 | Germany . | |
|---|---|---|---|
| 2624371 | 12/1976 | Germany . | |
| 3424630 | 1/1986 | Germany | 408/56 |
| 3529603 | 3/1987 | Germany . | |
| 653270 | 12/1985 | Switzerland . | |
| 294457 | 7/1928 | United Kingdom . | |
| 738048 | 10/1955 | United Kingdom . | |
| 1415137 | 11/1975 | United Kingdom . | |
| 1214448 | 2/1986 | U.S.S.R. | 408/204 |

Primary Examiner—Daniel W. Howell
Attorney, Agent, or Firm—Speckman, Pauley & Fejer

[57] ABSTRACT

A method and apparatus for producing deep drill holes, particularly in wood and similarly structured materials, in which two drill elements, embodied as hollow shafts with cutting ends formed as cutting elements and concentrically disposed one within the other, are operated at different speeds, the cutting end of the interior drill element running behind the cutting end of the exterior drill element.

17 Claims, 3 Drawing Sheets

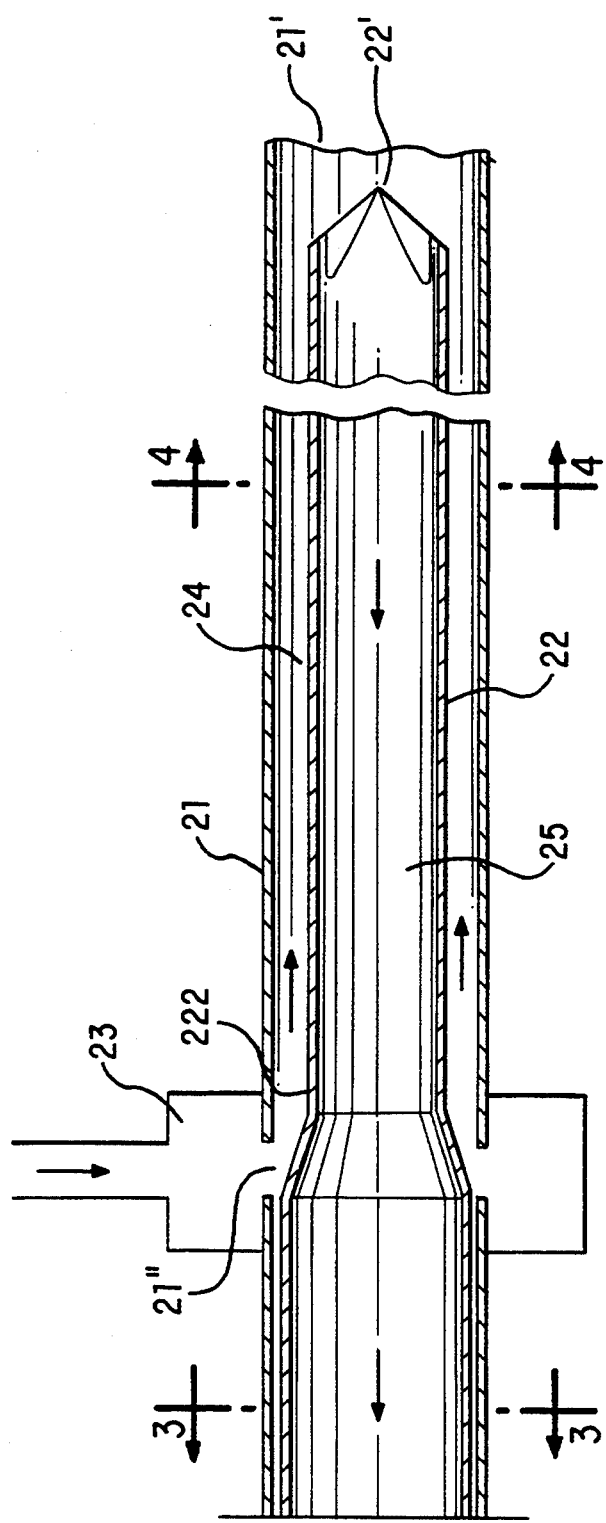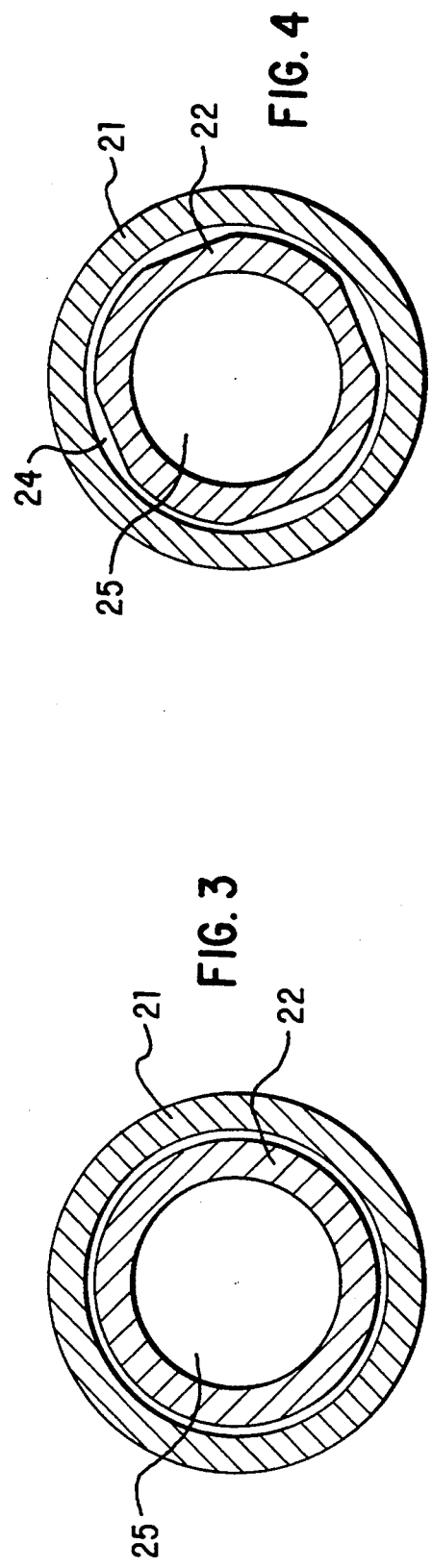

DEEP BORING DRILL

BACKGROUND OF THE INVENTION

1. Field of the Invention

This invention relates to a method of producing deep bore holes, particularly in wood and similarly structured materials, a deep boring drill suitable for this purpose and a deep boring drill apparatus used for executing the method.

2. Description of Prior Art

In the course of working materials, it is at times necessary to drill deep holes in a workpiece. In so doing, special attention must be paid to ensure that the drill does not run off center in the drill hole and, as a result, miss the desired direction. When working wood, the danger of the drill running off center is greatly increased due to the structure formed by the annual rings.

The removal of the chips must also be given careful consideration. With a long conveying path, in particular, the chips can block the drill, causing the drill to break. This, too, is the case, particularly in woodworking, due to chips frequently breaking off in large pieces.

In woodworking, the drilling of deep holes is mostly circumvented by either slitting a workpiece or machining a groove, and subsequently closing the open surface. The resulting seam is sometimes undesirable, particularly if it is located in plain view.

Different deep boring drills and methods connected therewith are known in the art which solve the problem of off-center running or chip removal in different ways. However, these deep boring drills are mainly employed for working metal or ceramics.

The deep boring drill disclosed in Swiss Patent Publication CH-A-653 270 operates by intermittent retraction, wherein the drill is automatically removed at constant time intervals, thereby removing the chips. Conventional twist drills are employed as drills.

However, this method has some disadvantages. For one, it requires an elaborate control for optimizing the advance and retraction moves in time for preventing the drill from reaching the end of the drill hole at too great a speed. Secondly, the drilling process is interrupted several times, not only resulting in loss of time, but also reducing the evenness of the drill hole. Thirdly, not all the chipped-off material is removed. The deeper the drill hole becomes, the greater the remainder of chips left in the drill hole becomes, which can result in blockage of the drill.

A deep boring drill is taught by British Patent Disclosure GB-A-1,415,137, the cutting elements of which are located in a tube. A second tube is centered in the first tube and connected to it, fixed against relative rotation. It is used for supplying a coolant which subsequently flows back out of the drilling location through the annular chamber between the two tubes. In so doing, it also removes the chips generated by the drilling. The construction of this drill is suitable only in a limited way for woodworking. If large chips break off, they can block the annular chamber and block the removal of chips. This possibly is further increased by the fact that the two concentric tubes are immovable with respect to each other.

A rotating circular saw device is taught by German. Patent Publication DE-A-26 24 371, having a guide drill and a rotating circular saw. The guide drill is a twist drill, on which the rotating circular saw in the form of a crown drill is fastened, fixed against relative rotation. In addition, the guide drill is seated ahead of the rotating circular saw. This device is not suitable for woodworking. If the guide drill moves along an annual ring, this can lead to off-center running of the drill.

Consequently, all known systems operate with one or more drill heads which can in part have different cutting surfaces, but which are connected to each other, fixed against relative rotation and, consequently, always operate at identical rpm.

SUMMARY OF THE INVENTION

It is an object of this invention to provide a method for producing deep drill holes, in particular in wood, by which functional chip removal is assured, even with materials which produce large chips, and by which a deep hole is made with a high degree of precision.

It is another object of this invention to provide a deep boring drill for producing deep drill holes in accordance with the method of this invention.

It is yet another object of this invention to provide a deep boring drill apparatus for operation of a deep boring drill in accordance with this invention.

These and other objects of this invention are attained by a method for producing deep drill holes comprising operating two drill elements embodied as hollow shafts with ends formed as cutting elements, concentrically disposed one within the other at different rpm, whereby the interior drill element runs slower than the exterior drill element.

A deep boring drill suitable for use in the method of this invention comprises two hollow shafts, concentrically disposed one within the other and rotatable independently. One end of each hollow shaft is provided with a cutting element. The end of the interior hollow shaft provided with a cutting element is set back with respect to the end of the exterior hollow shaft.

A deep boring drill apparatus suitable for use in the method of this invention comprises a drive motor having a hollow shaft.

BRIEF DESCRIPTION OF THE DRAWINGS

These and other objects and features of this invention will be better understood from the following detailed description taken in conjunction with the drawings wherein:

FIG. 2 is a longitudinal cross-sectional view of a deep boring drill in accordance with one embodiment of this invention;

FIG. 3 is a transverse cross-sectional view of the rear part of a deep boring drill in accordance with one embodiment of this invention taken along line 3—3 in FIG. 2;

FIG. 4 is a transverse cross-sectional view of the front part of a deep boring drill in accordance with one embodiment of this invention taken along line 4—4 in FIG. 2;

DESCRIPTION OF PREFERRED EMBODIMENTS

Figure 1:
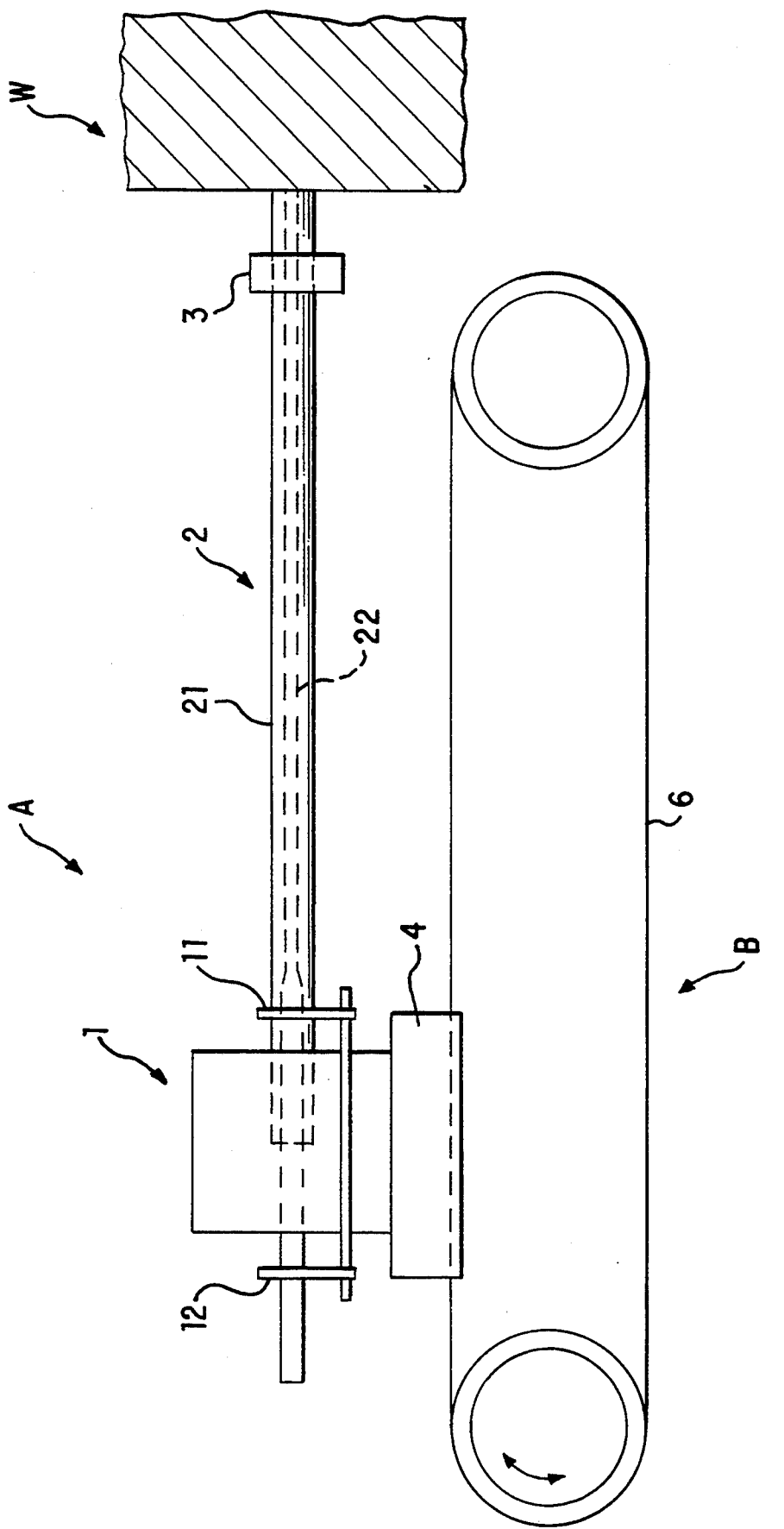
FIG. 1 is a schematic side view of a deep boring drill apparatus with a deep boring drill in accordance with one embodiment of this invention.

The deep boring drill apparatus for drilling deep holes in accordance with one embodiment of this invention essentially comprises, as can be seen in FIG. 1, a drill means A, an advancing means B and a frame, not shown. The drill means A and advancing means B are fastened on the frame. The drill means A performs the rotating movement of the drill and assures removal of the chips by a supply of compressed air, not shown. The advancing means B generates the forward movement of the drill means A and determines the depths of the drill hole.

In the advancing means B, an advancing motor 5 drives a transmission in the form of a closed chain 6 by means of a gear. A support element 4 is fastened on chain 6 which supports the drill means A. The desired advance of drill means A can be accomplished by advancing means B. The drill hole depth can also be set electronically or mechanically. The advancing means B can be assembled from commercially available parts and its construction can be arbitrarily selected. It can also be operated by compressed air.

The drill means A comprises a drive motor 1 and a deep boring drill 2. The drive motor 1 has a hollow shaft and drives the deep boring drill 2.

The deep boring drill 2 comprises two elongated, single- or multi-piece hollow shafts, disposed concentrically one inside the other, which form the drill elements. The outer diameter of the interior hollow shaft 22 corresponds to the inner diameter of the exterior hollow shaft 21, as can be seen in FIG. 3.

The exterior hollow shaft 21 is fastened on the drive motor 1 by known means and extends from the drive motor side facing the workpiece, hereinafter called drill side, at least by the depth of the desired drill hole. The interior hollow shaft 22 extends through the hollow shaft of the drive motor 1, thereby protruding from both sides of drive motor 1, the drill side and the back. The two hollow shafts engage different gearings: the exterior hollow shaft 21 engaging a large gearing 11, the interior hollow shaft 22 engaging a small gearing 12. Thus, the interior hollow shaft 22 runs at an rpm about 10 to about 200 times higher than the rpm of the exterior hollow shaft 21. In general, the rpm of interior hollow shaft 22 is on the order of 90 times higher than the rpm of the exterior hollow shaft 21.

The deep boring drill 2 is displaceably seated close to the workpiece W in a guide element 3. The guide element 3 in accordance with one embodiment of this invention is fastened on the frame, not shown, of the drill apparatus. The guide element 3 mainly assures the stability of the deep boring drill 2 at the start of drilling and guides it during the entire work time.

As can be seen in FIG. 2, the exterior hollow shaft 21 has openings 21" evenly distributed over its circumference, in a defined area on the drill side of drive motor 1 in the vicinity of the drive motor 1. A compressed air unit 23 is located over this area.

The interior hollow shaft 22 has longitudinal channels 222 symmetrically distributed on its circumference, which extend to the drill side end of the hollow shaft. These longitudinal channels 222 are created by grinding down the shell of the interior hollow shaft 22. Symmetrically distributed feed conduits 24 are located in the area between the two hollow shafts created in this way, as illustrated in FIG. 4.

The ends on the drill side of both shafts are provided with cutting elements. The exterior hollow shaft 21 comprises a bore crown 21' and the interior hollow shaft 22 comprise a core drill 22'. The core drill 22' of the interior hollow shaft 22 is set back in respect to the bore crown 21' of the exterior hollow shaft 21 or is flush therewith. In no case does it extend beyond the bore crown 21'. Consequently the interior drill element is slower than the exterior drill element. Both the exterior and the interior drill elements are preferably constructed of several parts. The bore crown 21' and the core drill 22' are formed on individual, short hollow cylinders which are placed on the elongated parts of the hollow shafts 21, 22, respectively. The actual cutters, preferably of a hard metal, are welded or soldered onto the drill heads formed in this way. In the case of the bore crown 21', this hard metal cutter is a serrated crown while in the case of the core drill, it is a special cutter plate. The cutters can be re-ground without dismantling the entire hollow shafts.

In an operational state, the bore crown 21' drills a plug out of the workpiece. It guides the deep boring drill 2 and by its shape prevents off-center running. The core drill 22' can have various cutters. The core drill 22' removes the core or plug of the bore. Because of its fast rotation it not only chips the core into the smallest pieces, but also grinds up the larger chips created by the rotation of the bore crown 21' of the exterior hollow shaft 21.

Figure 5:
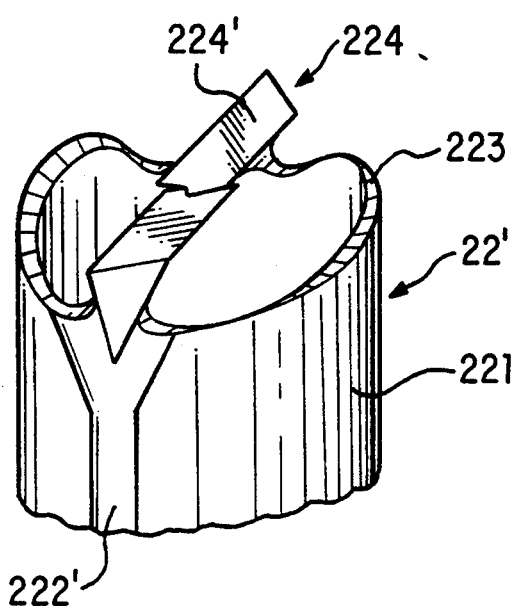
FIG. 5 is a perspective view of a core drill in accordance with one embodiment of this invention.
Figure 6:
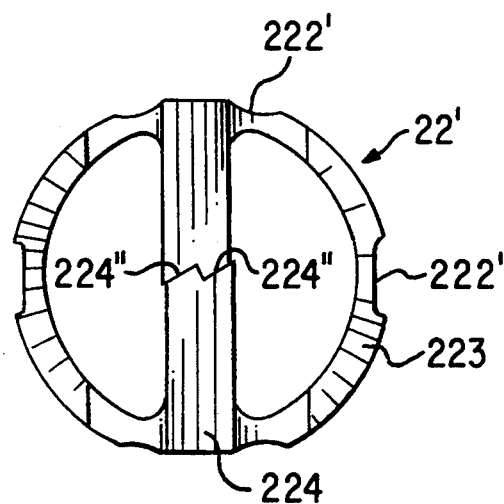
FIG. 6 is an end view of the core drill shown in FIG. 5.
Figure 7:
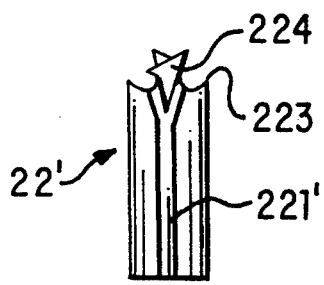
FIG. 7 is a side view of the core drill shown in FIG. 5.

So that the deep hole drill does not run off-center, even with wood having pronounced annual rings or in the area of branches, a special core drill 22' is used. If a core drill 22' is selected which has been designed with a tip, there is the danger that it will follow the pronounced annual rings in the wood and that the deep hole drill will run off-center in spite of the guidance of the bore crown 21'. Therefore, the core drill 22' in accordance with a preferred embodiment of this invention does not have a tip, but rather comprises a cutter disposed perpendicularly to the longitudinal direction of the interior drill element as shown in FIGS. 5, 6 and 7.

The core drill 22' comprises a short hollow cylinder forming the drill head and having an inner thread on one end by which it can be screwed on the corresponding outer thread of the interior hollow shaft 22. The cutting elements are located on the end opposite the threaded end and their cutting edges are shown as thin lines in the drawing figures. Two peripheral shoulder sections 223 are used as subordinated cutting elements, which are disposed diametrically with respect to each other and which end in cutting edges on the end opposite the casing 221 of the hollow cylinder. A cutter 224 in the shape of a plate, which is turned by 90° with respect to the connecting diagonal line of the shoulder sections 223, bridges the hollow cylinder diagonally. The cutter 224 projects beyond the peripheral shoulder sections 223 and is used as the primary cutting element. It comprises two main cutters 224', which are disposed symmetrically centered around the drill axis and the cutting edges of which extend parallel to the diagonal line. Thus, the cutting edge of the one main cutter 224' is located on one side of the diagonal line and the cutting edge of the other main cutter is located on the other side. Both main cutters 224 have the same, but opposite angle of inclination in respect to the drill axis. Because the cutting edges are located approximately perpendicularly in respect to the drill axis, the main cutters 224, 224' operate similar to a surface milling cutter. In the area of the drill axis, the main cutters 224' make a transition along their inclination into subsidiary cutters 224". These also extend symmetrically centered with respect to the drill axis and with the cutting edges form an acute angle in the plane of inclination.

The two shoulders of the cutter 224 on the hollow cylinder taper with respect to the upper area of the cutter 224. The hollow cylinder has four longitudinal channels 222', which are symmetrically distributed on the outer shell surface and extend over the entire length of the hollow cylinder. Respectively one longitudinal channel 22' terminates at the cutting edge of a peripheral shoulder section 223 The other two longitudinal channels 222', offset by 90°, extend as far as the shoulders of the cutter. In this area, the two longitudinal channels 222' branch in a v-shape and terminate on a side of the shoulder, respectively.

It is obvious that the longitudinal channels 222', which are used for supplying air, need to be flush with those multi-piece extension parts of the hollow shaft 22 which adjoin the drill head.

Compressed air is supplied from the outside by the compressed air supply unit 23. Compressed air flows through the feed conduits 24 between the two hollow shafts 21, 22 to the drill side end of the deep boring drill 2. In the process, it cools the two hollow shafts with the integrated cutting elements. At the same time, the interior hollow shaft 22 is seated by the air cushion. The core of the interior hollow shaft 22 is used as the removal conduit 25. The air escapes through this removal conduit and, in its role as a cooling and transport medium, simultaneously removes the chipped-off material from the workpiece away from the drill site to the outside. The chips are, thus, blown out of the interior hollow shaft 21. The special shape of the core drill 22' optimizes the air distribution at the drill point. The longitudinal channels 222' at the peripheral shoulder sections 223 guide the air into the vicinity of the bore crown 21' of the exterior hollow shaft 21, so that the material cut off there is picked up. The branched longitudinal channels 222' at the shoulders of the cutter 224 mainly pick up the chips generated by the cutter 224 and the peripheral shoulder sections 223.

The flow during the transport of the chips is assured by the method executed by this drill apparatus with a deep boring drill. The chips are reduced by the core drill 22' to sizes which are very much smaller than the diameter of the removal conduit 25. In addition, clumping of the fine chips, for example sawdust, is prevented in that vortices are generated by the rapid rotating movement and the disposition of the longitudinal channels 222' of the core drill 22', in which the chips are carried along as separate parts.

It is thus possible with this method to drill very deep holes of typical lengths of 1 to 2 meters without interruption of the work process. On the one hand, off-centered running of the drill is prevented by the shape and position of the bore crown 21' of the exterior shaft 21 and the special shape of the core drill 22' of the interior shaft 22. On the other hand, the removal of the chips is assured by the course of the cooling and transport medium and the functioning of the core drill.

I claim:

1. In a method for producing deep drill holes, in particular in wood and similarly structured materials, the improvement comprising: operating two drill elements, embodied as hollow shafts with cutting ends formed as cutting elements and disposed concentrically one inside the other, at different rpm, the cutting end of the interior drill element running behind the cutting end of the exterior drill element; and introducing a cooling and transport medium from outside of said drill elements between said drill elements, said cooling and transport medium subsequently flowing between the drill elements to a drill site and flowing back from said drill site in a core of the interior drill element, thereby carrying away chipped-off material from said drill site.

2. In a method in accordance with claim 1, wherein the exterior drill element is operated at a lower rpm than the interior drill element.

3. In a method in accordance with claim 2, wherein the rpm of the interior drill element are 10 to 200 times higher than the rpm of the exterior drill element.

4. A deep boring drill comprising two hollow shafts (21, 22), disposed concentrically one inside the other and rotatable independently of each other, one end of each of said hollow shafts (21,22) having at least one cutting element, the end of the interior hollow shaft (22) having said at least one cutting element set back with respect to the end of the exterior hollow shaft (21) having said at least one cutting element; at least one supply conduit (24) for a cooling and transport medium disposed between said hollow shafts (21, 22); and a core of the interior hollow shaft forming a removal conduit (25) for said cooling and transport medium.

5. A deep boring drill in accordance with claim 4, wherein said exterior hollow shaft (21) forms at least one opening (21") for admitting a cooling and transport medium.

6. A deep boring drill in accordance with claim 5, wherein the interior hollow shaft (22) forms a plurality of longitudinal channels (222), symmetrically distributed on its circumference, extending from said at least one opening (21") to said at least one cutting element.

7. A deep boring drill in accordance with claim 4, wherein each of the hollow shafts (21, 22) is formed of a plurality of shaft components.

8. A deep boring drill in accordance with claim 4, wherein said at least one cutting element of the exterior hollow shaft (21) is embodied as a bore crown (21').

9. A deep boring drill in accordance with claim 4, wherein said at least one cutting element of the interior hollow shaft (22) is embodied as a core drill (22') in the form of a hollow cylinder.

10. A deep boring drill in accordance with claim 9, wherein the core drill (22') comprises a cutter (224) which bridges the hollow cylinder diagonally, said cutter (224) having a plurality of cutting edges (224') which extend approximately perpendicularly to the drill axis.

11. A deep boring drill in accordance with claim 10, wherein the core drill (22') comprises two peripheral shoulder sections (223) each of said shoulder sections (223) having at least one shoulder cutting edge, each of said shoulder cutting edges respectively disposed turned by 90° with respect to the cutter (224), and the cutter (224) extends beyond the shoulder sections (223).

12. A deep boring drill in accordance with claim 11 wherein said core drill (22') forms a plurality of longitudinal channels (222') symmetrically distributed over the circumference of the core drill (22'), at least one of said plurality of longitudinal channels (222') projecting beyond the peripheral shoulder sections (223), and one of said longitudinal channels (222'), branched in the shape of a V, respectively terminating at a shoulder of the cutter (224) at the hollow cylinder.

13. A deep boring drill apparatus for executing the method of claim 1, comprising a drive motor (1) having a hollow shaft.

14. A deep boring drill apparatus in accordance with claim 13, wherein an interior hollow shaft (22) extends from both sides of the drive motor (1), an end of said interior hollow shafts (22) without a cutting element being open.

15. A deep boring drill apparatus in accordance with claim 13, wherein a deep boring drill (2) is displaceably seated in a rigid guide element (3) said rigid guide element (3) positionable near a workpiece (W).

16. A deep boring drill apparatus in accordance with claim 15, further comprising an advancing means (B) for advancing said deep boring drill.

17. A deep boring drill in accordance with claim 11, wherein at least one of said plurality of longitudinal channels (222'), said plurality of longitudinal channels (222') being symmetrically distributed over the circumference of the core drill (22'), projects beyond two peripheral shoulder sections (223) of said core drill (22'), and one of said longitudinal channels (222'), branched in the shape of a V, respectively terminates at a shoulder of a cutter (224) at the hollow cylinder.

* * * * *